United States Patent
Linner et al.

(10) Patent No.: US 8,849,931 B2
(45) Date of Patent: Sep. 30, 2014

(54) LINKING CONTEXT-BASED INFORMATION TO TEXT MESSAGES

(75) Inventors: Jonathon Linner, Fort Lauderdale, FL (US); Juho-Pekka Virolainen, Espoo (FI); Robert Lawson, Burlingame, CA (US)

(73) Assignee: IDT Messaging, LLC, Newark, NJ (US)

( * ) Notice: Subject to any disclaimer, the term of this patent is extended or adjusted under 35 U.S.C. 154(b) by 168 days.

(21) Appl. No.: 13/418,286

(22) Filed: Mar. 12, 2012

(65) Prior Publication Data

US 2012/0239761 A1    Sep. 20, 2012

Related U.S. Application Data

(60) Provisional application No. 61/453,028, filed on Mar. 15, 2011.

(51) Int. Cl.
| | | |
|---|---|---|
| G06F 15/16 | (2006.01) | |
| G06F 17/30 | (2006.01) | |
| G06F 3/00 | (2006.01) | |
| G06F 17/27 | (2006.01) | |

(52) U.S. Cl.
CPC .................................. G06F 17/2765 (2013.01)
USPC ........... 709/206; 709/204; 707/755; 707/769; 707/779; 719/313; 719/320

(58) Field of Classification Search
None
See application file for complete search history.

(56) References Cited

U.S. PATENT DOCUMENTS

| | | | |
|---|---|---|---|
| 2003/0187733 A1* | 10/2003 | Hertling et al. | 705/14 |
| 2004/0008828 A1* | 1/2004 | Coles et al. | 379/88.01 |
| 2004/0187082 A1* | 9/2004 | Hathaway | 715/531 |
| 2005/0289113 A1* | 12/2005 | Bookstaff | 707/1 |
| 2006/0013487 A1* | 1/2006 | Longe et al. | 382/229 |
| 2007/0088687 A1* | 4/2007 | Bromm et al. | 707/4 |
| 2007/0265006 A1* | 11/2007 | Washok et al. | 455/435.1 |
| 2007/0265990 A1* | 11/2007 | Sidhu et al. | 705/418 |
| 2008/0177721 A1* | 7/2008 | Agarwal et al. | 707/4 |
| 2008/0200153 A1 | 8/2008 | Fitzpatrick et al. | |
| 2008/0243619 A1* | 10/2008 | Sharman et al. | 705/14 |
| 2008/0268882 A1 | 10/2008 | Moloney | |
| 2008/0275864 A1* | 11/2008 | Kim et al. | 707/5 |
| 2009/0007148 A1* | 1/2009 | Czerwinski et al. | 719/320 |

(Continued)

OTHER PUBLICATIONS

"IntelliTXT," Wikipedia®, last modified May 17, 2012, 1 page, [Online] [Retrieved on Jun. 22, 2012], Retrieved from the Internet<URL:http://en.wikipedia.org/wiki/IntelliTXT>.

(Continued)

*Primary Examiner* — Moustafa M Meky
*Assistant Examiner* — Ho Shiu
(74) *Attorney, Agent, or Firm* — Davidson Berquist Jackson & Gowdey, LLP

(57) ABSTRACT

A system and a method are disclosed for adding linked content to text messages. Messages are analyzed to determine the context and meaning of a conversation between users, and linked content relevant to the conversation is selected and associated with certain words or phrases in the messages. This process for enhancing text messages beneficially provides users with additional information related to the meaning of their conversation, and also provides advertisers with a valuable new way of delivering highly relevant advertisements to a precise group of users.

22 Claims, 7 Drawing Sheets

(56) References Cited

U.S. PATENT DOCUMENTS

| | | | |
|---|---|---|---|
| 2009/0031323 A1* | 1/2009 | Hazra | 719/313 |
| 2009/0119368 A1* | 5/2009 | O'Sullivan et al. | 709/204 |
| 2009/0292526 A1* | 11/2009 | Harari et al. | 704/9 |
| 2010/0041422 A1* | 2/2010 | Wormald et al. | 455/466 |
| 2010/0153106 A1* | 6/2010 | Frazier et al. | 704/235 |
| 2010/0223279 A1* | 9/2010 | Scott | 707/769 |
| 2010/0246784 A1* | 9/2010 | Frazier et al. | 379/88.13 |
| 2011/0021211 A1 | 1/2011 | Ohki | |
| 2011/0106892 A1* | 5/2011 | Nelson et al. | 709/206 |
| 2012/0131024 A1* | 5/2012 | Park | 707/754 |
| 2012/0197937 A1* | 8/2012 | Kakarla et al. | 707/772 |

OTHER PUBLICATIONS

"Keyword Advertising," Wikipedia®, last modified Apr. 8, 2012, 1 page, [Online] [Retrieved on Jun. 22, 2012], Retrieved from the Internet<URL:http://en.wikipedia.org/wiki/Keyword_advertising>.

PCT International Search Report, PCT Application No. PCT/US12/28950, May 31, 2012, 2 pages.

PCT International Written Opinion, PCT Application No. PCT/US12/28950, May 31, 2012, 4 pages.

PCT International Preliminary Report on Patentability, PCT Application No. PCT/US12/28950, Sep. 26, 2013, 6 pages.

* cited by examiner

LINKING CONTEXT-BASED INFORMATION TO TEXT MESSAGES

CROSS REFERENCE TO RELATED APPLICATIONS

This application claims the benefit of U.S. Provisional Application No. 61/453,028, filed Mar. 15, 2011, which is incorporated by reference in its entirety.

BACKGROUND

1. Field of Art

The disclosure generally relates to the field of text-based communication, and more particularly to dynamically linking content to text-based personal communications.

2. Description of the Related Art

Text messaging has become an extremely popular method of communication due to its affordability and ease of use. On any given day, people all over the world exchange billions of text messages regarding a diverse range of topics. People may use text messages to make arrangements for group meals or activities, to solicit opinions about potential purchases at a retail establishment, or simply to exchange short pleasantries with friends.

However, despite their tremendous popularity and convenience, current text messaging systems are also rigid and non-interactive. Many messaging services only allow users to exchange short text strings, while some services also allow users to attach small multimedia items, such as images, to their messages. Regardless, text-based communication remains a relatively outdated and feature-poor service when compared to other interactive web-based features that are readily available on smartphones, computers, and other devices that people typically use to exchange messages.

SUMMARY

Embodiments relate to providing information associated with a text message that is transmitted via a network using a push technology to establish or continue a conversation between a plurality of users. One or more character strings associated with information likely to be inquired by at least one of the plurality of users within the context of the conversation are identified within the text message, and the information corresponding to each character string is generated. The identified character strings are processed so that the character strings can be displayed in a manner distinguishable from other text in the text message. When a user selects one of the character strings, the information corresponding to the selected character strings is displayed to the user.

In one embodiment, the information corresponding to each character string in the text message is generated by analyzing the text message together with at least one additional text message that is part of the same conversation. In another embodiment, the information is generated by analyzing a user profile associated with at least one of the plurality of users in the conversation.

In still another embodiment, character strings are identified in the text message by executing at least one targeting rule. Targeting rules contain a primary condition that specifies one or more character strings, at least one secondary condition, and a function to be executed at the client device. If one of the specified character strings is present in the text message and the text message satisfies the secondary conditions, then the specified character string that is present in the text message is identified. If a user selects the identified character string, then the client device executes the specified function.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
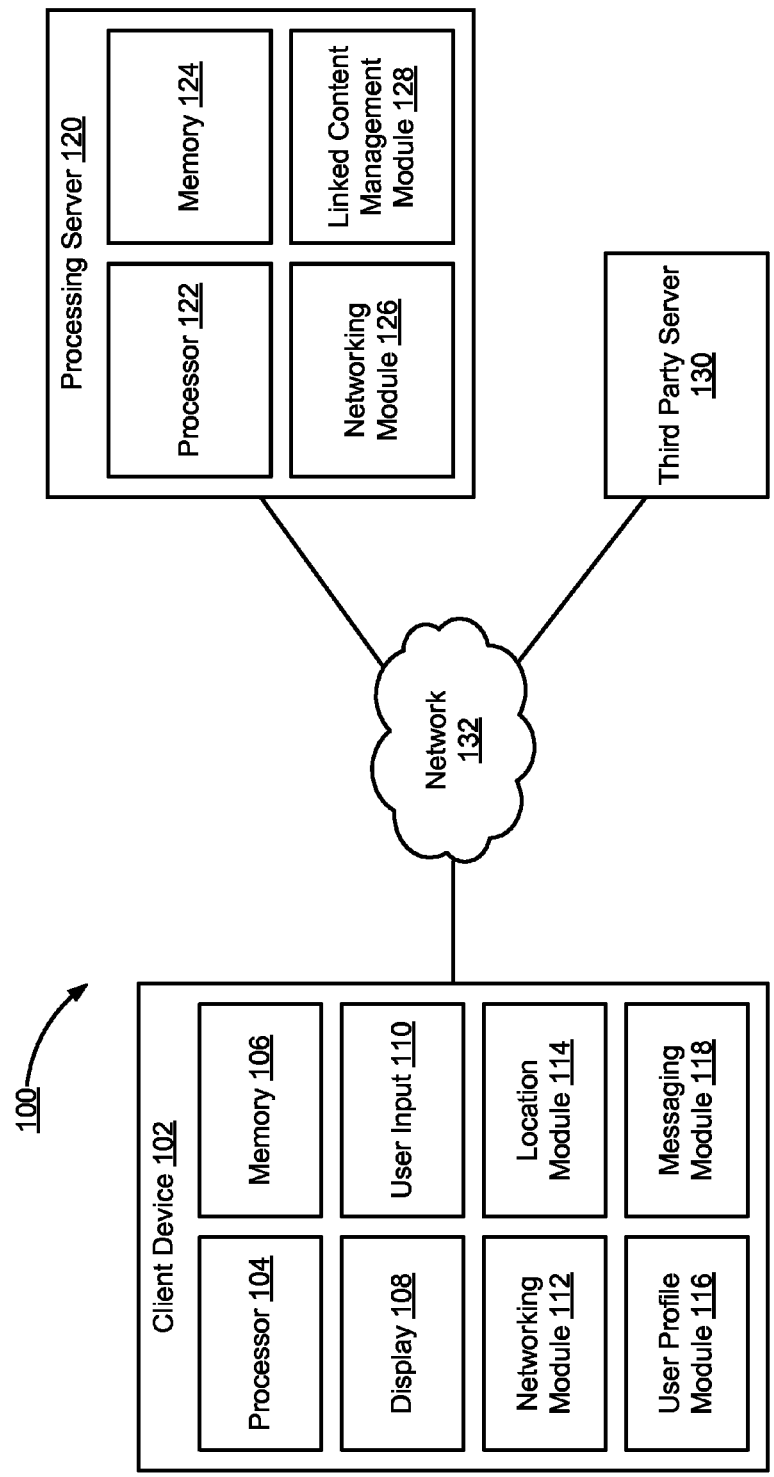
FIG. 1 is a network diagram illustrating a system environment suitable for linking content to text messages, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to adding linked content to certain words or phrases in text messages in a conversation between two or more users. A text message is analyzed to generate a linked message including selected words or phrases in the text message linked with content relevant to the context of the text message based on various information associated with the conversation. When a user selects one of the links after being presented with the linked message, the user is presented with the content linked to the selected link. The linked content is useful to the users because it provides a convenient way for the users to access additional information via a simple interaction with their client devices. The linked content is also valuable to advertisers because highly targeted advertisements may be added to the linked content and delivered to users.

As used herein, a text message is any text-based personal communication between two or more users communicated by various communication protocols. Although text messages are typically interpreted as messages sent over the Short Messaging System (SMS) or the Multimedia Messaging Service (MMS), a text message as used herein may refer to any text-based communication sent over a cellular network, over the internet, or over any other networking technology. In addition to SMS and MMS messages, text messages may also be sent over instant messenger (IM), social networking systems (e.g., Facebook), other chat messaging protocols, Internet Protocol (IP) messaging systems, the Rich Communication Suite (RCS), email, or other messaging services. A text message may also be generated based on a message in some other medium or format (e.g., a visual voicemail message that is transcribed from an audio message). In some cases, a multimedia item (e.g., an image or video) may be attached to a text message. In addition, text messages are typically push-based communications that are intended for reception by a targeted user or a targeted group of users. In other words, the delivery of a text message to its intended recipient is typically initiated by a text messaging server, not by the intended recipient. A text messaging system can also be implemented with pull technology by configuring client devices to frequently request new messages from a messaging server. However, text-based content that is requested by a user or does not represent a personal communication (e.g., a web page) is not a text message for the purposes of the description presented herein.

A conversation, as used herein, is a series of related text messages that are exchanged between a group of users. When one of the users adds a new text message to a conversation, the new message is sent to the other users in the group. For example, if a first user adds a new text message to a conversation between a group of three users, then the new text message is sent to the second user and the third user. Thus, a text message conversation may simulate a real-life conversation because users communicate to the group at large and not to a specific person or a subset of the people in the group.

Overview of System Architecture

FIG. 1 is a network diagram illustrating a system environment 100 suitable for adding linked content to text-based communications, according to one embodiment. The system environment 100 may include, among other components, a client device 102, a processing server 120, a third party server 130, and a network 132. The system environment 100 may include other components not illustrated in FIG. 1 such as security servers (to enhance security of the environment 100) and cache servers (to enhance response performance of the environment 100).

The client device 102 may be any electronic device containing the components described above. For example, the device 102 may be a smartphone, a personal digital assistant (PDA), a tablet computer, a laptop computer, a desktop computer, a game console, and a telematics unit in a vehicle. Although only one client device 102 is shown for the sake of brevity, the system 100 may include multiple client devices 102 simultaneously exchanging data with the processing server 120, one or more third-party servers 130, or with each other.

The client device 102 may contain, among other components, a processor 104, memory 106, a display 108, user input devices 110, a networking module 112, a location module 114, a user profile module 116, and a messaging module 118. The processor 104 is a hardware device capable of executing machine-readable instructions. The memory 106 is a non-transitory computer-readable storage medium that can store data and machine-readable instructions for the processor 104. Although pictured as single modules, the processor 104 and memory 106 may include multiple components. For example, the processor 104 may include a separate central processing unit (CPU) and a dedicated graphics processor (GPU), while the memory 106 may contain a combination of volatile memory (e.g., RAM) and non-volatile memory (e.g., flash memory, hard disk, etc.).

The display 108 is an electronic component that displays information to a user. The display 108 may be, for example, a LCD screen, an electrophoretic ink (E Ink) display, or a heads-up display (HUD). The user input devices 110 allow a user to provide user input to the client device 102. The user input devices 110 may include, for example, a keyboard, mouse, other external buttons, an accelerometer, a microphone, or a camera. In one embodiment, a single device, such as a touchscreen, may act as a display 108 and a user input device 110.

The networking module 112 exchanges data with other devices connected to the network 132. The networking module 112 may support any number of wired or wireless connection technologies, such as Ethernet, 802.11, GSM (Global System for Mobile Communications), 3G, 4G, or CDMA (Code Division Multiple Access).

The location module 114 uses various methods to determine the geographical location of the client device 102. In one embodiment, the location module 114 communicates with a global navigation satellite system (GNSS) such as the Global Positioning System (GPS) to determine a precise latitude and longitude for the client device 102. The location module 114 may also analyze the Internet Protocol address (IP address) of the client device 102 or use information associated with a connected cellular tower or wireless access point to determine location information.

The user profile module 116 collects and stores information about the user of the client device 102. In particular, the user profile module 116 may collect information already present on the client device 102, such as the language setting and operating system of the device 102 or the user's contact information and place of residence (e.g., from an address book application) to add to a profile of the user. In one embodiment, the user profile module 116 sends the collected information to the processing server 120 to be aggregated with information from other sources, such as information from other client devices belonging to the user or information from the user's accounts on social networking systems using a network 132. In an alternative embodiment, the user profile module 116 may store the information locally (i.e., on the memory 106) without sending it over the network 132 to any other device.

The messaging module 118 processes text messages that are sent and received by the client device 102. The messaging module 118 can include support for a number of different messaging protocols and technologies, including traditional text messaging technologies such as SMS (Short Message Service), IP messaging, instant messaging protocols, or email. The messaging module 118 may also be compatible with other types of messaging services, such as a "visual voicemail" service that uses speech recognition algorithms to transcribe audio messages into text messages.

In the present embodiment, the messaging module 118 sends newly-received text messages to processing server 120 and receives link data from the processing server 120 indicating which words and phrases within the message are to be turned into links. After receiving the link data, the messaging module 118 displays the text message with the links included. The messaging module 118 may optionally receive the linked content corresponding to each link at the same time as the link data. In this case, the messaging module 118 may also display visual representations (e.g., icons) next to certain links to indicate that the corresponding linked content contains a certain type of result. For example, if one of the items of linked content is a coupon, then the messaging module 118 may display the corresponding link with a dollar sign ($) icon to indicate to the user that selecting the link may result in a discount on a product. The messaging module 118 may alternatively retrieve the linked content corresponding to a link from the processing server 120 after detecting that the user has selected the link.

The messaging module 118 may also display a visual representation or a separate character string independently of the original text of the message (e.g., at the end of a message) and have the added item function as a separate link. This function may be useful when the linked content is selected based on information from multiple sources (e.g., user profile data and multiple conversation messages) and cannot easily be associated with a single character string.

In an alternative embodiment, all or part of the link data and the corresponding linked content is generated in the messaging module 118 on the client device 102 instead of on the processing server 120, and this embodiment is described in detail with reference to FIG. 6A, FIG. 6B, and FIG. 7.

The processing server contains 120 a processor 122, memory 124, a networking module 126, and a linked content management module 128. The operation of the processor 122, memory 124, and networking module 126 is similar to the operation of the corresponding devices 104, 106, 112 on the client device 102 so a detailed explanation of these components 122, 124, 126 is omitted for the sake of brevity. However, it should be noted that the processing server 120 is likely to have a more powerful processor 122 and a larger memory 124 capacity than the client device 102.

The linked content management module 128 receives, maintains, and stores information used to analyze text messages and add relevant linked content. A detailed description of the linked content management module 128 is provided with reference to FIG. 2A.

The third-party server 130 is any server that operates independently of the processing server 120. For example, the third-party server 130 may be a social networking system (e.g., Facebook, Foursquare, Meetup, etc.) that provides additional user profile information that the linked content management module 128 may use to customize the linked content provided to a user. The third party server 130 may also be a website that provides some of the linked content that the linked content management module 128 adds to messages. For example, if the linked content management module 128 may receive data from third-party servers 130 that provide information about news, weather, shopping and dining establishments, or local events. Although only a single third-party server 130 is shown, there may be multiple third-party servers 130 simultaneously providing different types of data to the processing server 120 and multiple client devices 102.

Figure 2A:
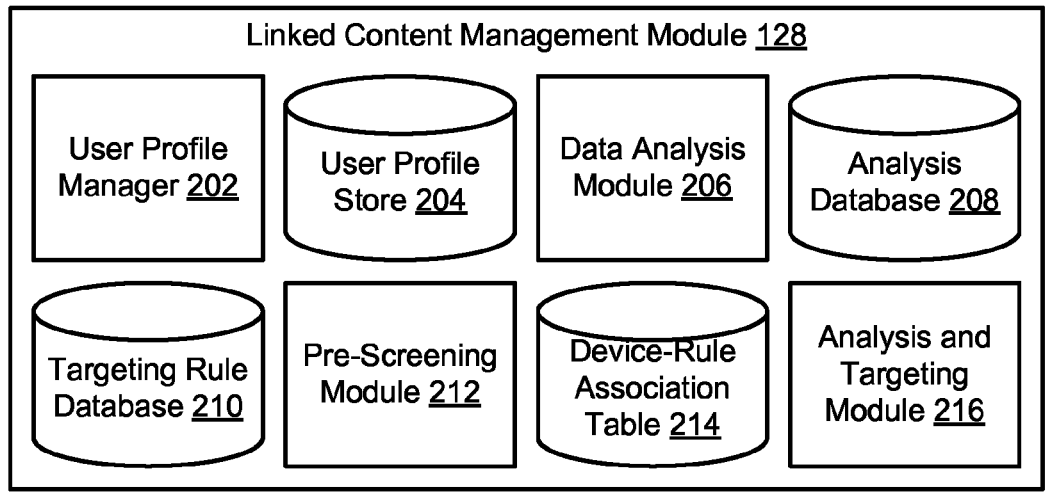
FIG. 2A is a block diagram illustrating the linked content management module of FIG. 1, according to one embodiment.

FIG. 2A is a block diagram illustrating the linked content management module 128 of FIG. 1, according to one embodiment. The linked content management module 128 may contain, among other components, a user profile manager 202, a user profile store 204, a data analysis module 206, an analysis database 208, a targeting rule database 210, a pre-screening module 212, a device-rule association table 214, and a message analysis and targeting module 216.

The user profile manager 202 collects user information from different sources and compiles the information into a profile for each user of the system 100. The user profiles are saved in the user profile store 204, and the analysis and targeting module 216 may use information in the user profile 204 to select linked content when processing new text messages. As described with reference to the user profile module 118 of FIG. 1, the user profile manager 202 may collect user information from a plurality of client devices 102 belonging to or operated by the same user, from the user's accounts on different third-party social networking systems (e.g., Facebook, Foursquare, Meetup), or from any other entity that may contain information associated with the user.

The collected user information may include, for example, demographic information (e.g., birthday, age, gender, race), location information (e.g., home town, city of residence, past travel activity), dining and entertainment preferences (e.g., favorite types of food, favorite movie genres), preferred recreational activities (e.g., rock climbing, running, computer games, gambling), information related to a user's wireless bill or data usage, applications that a user has downloaded to his or her client devices 102, or any other information that may allow the linked content management module 128 to provide users with relevant linked content. The collected user information may be based on any combination of user-provided data and historical data. For example, a user's dining preferences may be based on the user's self-described preferences on a profile page of a social networking system and on the user's use of a "check-in" function to announce the user's presence at a particular dining establishment on the social networking system.

To preserve the user's privacy, the user can opt out of allowing the user profile manager 202 collect some or all of the information mentioned above. In one embodiment, the user profile manager 202 may be configured to obtain a user's permission (e.g., a username and password) before gaining access to the user's accounts on third-party social networking services. In another embodiment, the user profile manager 202 may provide an interface that allows the user to select which types of information may be collected. For example, the user may indicate that the user profile manager 202 may collect the user's demographic information but not the user's dining preferences.

The data analysis module 206 receives and analyzes data related to user interactions with previously-added linked content. For example, the data analysis module 206 may receive a notification when a user selects a link that was generated, or when a user selects an item of linked content. The data analysis module 206 can generate aggregate data based on the notifications from multiple users of the system 100 and store the data in the analysis database 208. The aggregate data can include, for example, the frequency with which users select a certain link or item of linked content, or the total number of times a link or an item of linked content is selected. The data analysis module 206 may also generate aggregate data based on changes in user activity over certain time frames (e.g., how selection frequency for a link varies over a 24-hour period). The components of the analysis and targeting module 216 can subsequently use the data in the analysis database 208 to refine the algorithms that the module 216 uses to generate links and linked content for new text messages. The data in the analysis database 208 can also be used to determine how frequently a certain advertisement was selected by users, and this data can then be used to measure the effectiveness of an advertising campaign and determine how much money the advertiser should pay for the campaign.

The targeting rule database 210 stores targeting rules that are used to deliver targeted linked content based on a series of predefined conditions. For example, a targeting rule could be configured to display an advertisement for Bob's Burger Bar (in addition to other relevant results) when a user sends a message including the word 'burger' while located within 2 miles of the physical address of Bob's Burger Bar. A detailed explanation of the contents and functionality of targeting rules is provided with reference to FIG. 3.

The pre-screening module 212 associates targeting rules with individual client devices 102 based on one or more pre-screening criteria that are selected from the conditions in the targeting rule. Pre-screening criteria are conditions that are based on information associated with a user or a client device 102 that is less likely to change over time. For example, conditions based on a user's race, gender, age, language (i.e., the language of the client device 102), device platform, or hometown may be selected as pre-screening criteria. To determine whether a targeting rule should be associated with a client device 102, the pre-screening module 212 determines whether the client device 102 and the corresponding user profile satisfy the pre-screening criteria. If the pre-screening criteria are satisfied, then the pre-screening module 212 saves an association between the client device 102 and the targeting rule in the device-rule association table 214. The stored association causes the analysis and targeting module 216 to execute the targeting rule when the client device 102 sends a new message. Pre-screening and associating the targeting rules in this manner beneficially allows for faster performance when adding linked content to a new message because the targeting and analysis module 216 does not spend time executing irrelevant targeting rules with conditions that the message and the corresponding user are unlikely to satisfy.

The analysis and targeting module 216 receives new text messages and analyzes various aspects of the text messages. The module 216 uses the analysis to turn certain words and phrases in the text messages into links and to add linked content to those words and phrases. A detailed description of the analysis and targeting module 216 is presented below in conjunction with FIG. 2B.

Analysis of Text Messages

Figure 2B:
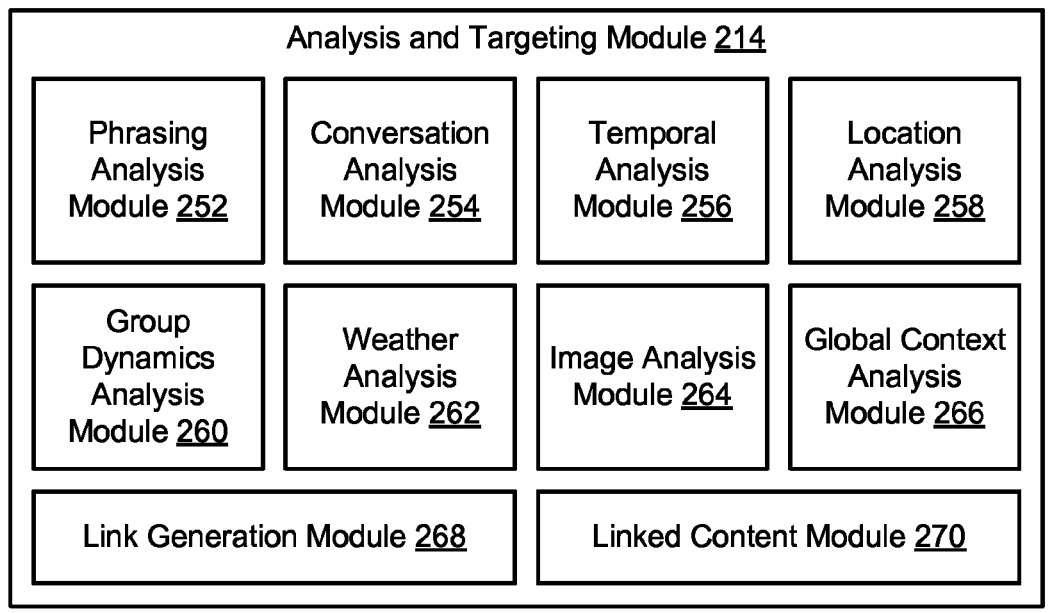
FIG. 2B is a block diagram illustrating a detailed view of the message analysis and targeting module of FIG. 2A, according to one embodiment.

FIG. 2B is a block diagram illustrating a detailed view of the analysis and targeting module 216 of FIG. 2A, according to one embodiment. The module 216 may contain, among other components, a series of analysis modules 252 through 266, a link generation module 268, and a linked content module 270.

The phrasing analysis module 252 analyzes the context of individual words in a text message to determine the meaning of the words. For example, if a user includes the string "root beer" in a message, the phrasing analysis module 252 would analyze the message and determine that the words "root" and "beer" are part of a single phrase. As a result, instead of generating separate links for "root" (which may lead to results for gardening stores) and "beer" (which would likely result in listings for nearby bars), the phrasing analysis module 252 would instruct the link generation module 268 to turn the string "root beer" into a single link that provides results that are likely to be more relevant to the user.

The conversation analysis module 254 analyzes the content of previous text messages in a conversation to find contextual information that may be used to refine the linked content that is provided for new messages in the conversation. For example, the phrasing analysis module 252 might not be able to determine that the word "rabbit" in the message "How about some rabbit?" is meant to have a different meaning than the word "rabbit" in the message "How about a rabbit?" However, the conversation analysis module 254 may analyze the previous messages in each conversation and determine that the conversation containing the first message was a discussion of dinner plans, whereas the conversation containing the second message was a discussion related to adopting a pet. In this case, the linked content module 270 may add a link to a list of local restaurants that serve rabbit stew in the first message and add a link to a list of local animal shelters and pet stores in the second message. As illustrated in this example, the conversational context of a message may be analyzed to link relevant information to words or phrases. Although mistakenly displaying results for animal shelters may simply be a minor annoyance for a user who wishes to enjoy rabbit stew with a group of friends, displaying results for rabbit stew may be an extremely upsetting and traumatizing experience for a user who wishes to adopt a pet rabbit and may discourage the user from selecting links in future text messages.

The temporal analysis module 256 analyses the timestamps on the text messages in a conversation to determine a temporal context for the conversation. For example, if two users exchange a series of messages in the morning and mention the word "lunch," then the users are more likely to be making lunch plans. Meanwhile, if a conversation that occurs in the afternoon contains the word "lunch," then the conversation may be a discussion between two people about what they ate for lunch earlier in the day. The temporal analysis module 256 may also work in conjunction with the conversation analysis module 254 to determine a timeframe for a proposed activity. For example, if the conversation analysis module 254 encounters a message such as "let's go to lunch later today," then the phrase "later today" may be combined with the timestamp data for the message to filter out results for dining establishments that will not be open during lunch hours on the day the message was sent.

The temporal analysis module 256 may also use timestamps to evaluate the relevance of older messages. For example, if a conversation consists of five three-month-old messages and twelve messages that were exchanged within the past two hours, then the temporal analysis module 256 may determine that the first five messages are less relevant and instruct the other analysis modules to place less weight on the content of the older messages. The temporal analysis module 256 may also work in conjunction with the conversation analysis module 254 to determine the relevance of older messages. For example, if the conversation analysis module 254 determines that the five older messages are somehow related to the twelve newer messages, then the older messages may be given the same weight as the newer messages.

The location analysis module 258 uses geographical data for a client device 102 to determine information about a user's location. In one embodiment, the location analysis module 258 simply receives location data (e.g., latitude and longitude coordinates) from the location module 114 of the client device 102. In another embodiment, the location analysis module 258 may work in conjunction with the location module 114 to generate geographical data for the client device 102. For example, the location analysis module 258 may receive the IP address of the client device 102 from the location module 114 and use IP geolocation techniques to find the location for the client device 102.

After receiving or determining location data for the client device 102, the location analysis module 258 can transform the geographical location data into a point of interest (e.g., the address corresponding to the latitude and longitude coordinates of the client device 102). The location analysis module 258 may also classify the point of interest (e.g., whether the address is a shopping mall, a restaurant, a park, a residence, etc.), which allows the linked content module 270 to select linked content that has a meaningful relationship to a user's surroundings. For example, if a user sends a message containing the word "sweater" while in a shopping mall, the linked content module 270 may link the word "sweater" to an advertisement from a store in the same shopping mall that is having sale on sweaters. The location analysis module 258 can also determine whether the client device 102 is inside a region defined by a "geofence," which is a polygonal region whose vertices are defined by at least three sets of latitude/longitude coordinates. This function could be used, for example, to determine whether the user is in close proximity to a location of interest, such as a concert. This function could also be used in lieu of performing a point of interest analysis to determine whether the user is present in a large location, such as a particular park or stadium.

The location analysis module 258 can also use geographical location data for multiple users in a conversation to find a common region that is accessible to the multiple users. For example, if a first user located in a first city is making plans to go shopping with a second user located in a second city, then the location analysis module 258 may define a common region between the two cites and instruct the linked content module 270 to place more weight on shopping malls inside the common region. The creation of a common region allows the linked content module 270 to select location-based results that are convenient for both users in the conversation.

In addition to using geographical data, the location analysis module 258 may also operate in conjunction with the conversation analysis module 254 to infer the location of a user or the desired location of a proposed social event. For example, if a user sends a message that says, "Let's have drinks in Palo Alto tonight," then the location analysis module 258 may skip any data-based location analysis and simply instruct the linked content module 270 to select results in Palo Alto. The location analysis module 258 may also use data-based location analysis in addition to information inferred from conversation messages. For example, if the message says "Let's have drinks near Palo Alto tonight," then the location analysis module 258 may still determine the locations of the users in the conversation and define a common region as described above, but the module 258 may also shift the common region so that the region is closer to Palo Alto.

The results generated by the location analysis module 258 may change based on the current location of the users, especially if no location can be inferred from the conversation messages. For example, suppose a user is commuting to work in the morning and sends a message that says "Let's have drinks tonight" to two other users and the link generation module 268 turns the word "drinks" into a link. If all three users are in a first city during the day, then the location analysis module 258 would instruct the linked content module 270 to provide results for bars and nightclubs in the first city if one of the users selects the link during the day. However, if the three users travel to a second city after work, then the location analysis module 258 would instruct the linked content module 270 to provide results in the second city when one of the users selects the link. Thus, a link generated for the same message may yield different linked content depending on the instantaneous location of the users in the conversation. Similarly, the results from the point of interest, "geofence," and common region analysis techniques described above may also vary when the location of one or more users changes.

The group dynamics analysis module 260 analyzes user profiles of a group of people in a conversation to find characteristics that are common to the group. For example, if a group of high school students exchange a series of text messages to discuss weekend activities, then the group dynamics analysis module 260 would examine the user profile of each student to determine whether the students share any common interests. For example, the group dynamics analysis module 260 may determine that each of the students enjoy skateboarding and basketball, and the linked content module 270 can use this analysis to link a word in one of the conversation messages to a list of nearby skate parks and basketball courts. Thus, the group dynamics analysis module 260 allows the linked content module 270 to provide relevant linked content in a conversation even if the conversation only contains superficial messages such as "Hey! What should we do this weekend?" and "No idea. I'm fine with anything." that provide little useable information regarding the group's preferences.

The group dynamics analysis module 260 may also take into account the number of people who are participating in a conversation. For example, if a group of six people are exchanging text messages to make plans for a group dinner, then the group dynamics analysis module 260 may instruct the linked content module 270 to filter out restaurants that do not have seating for groups of six or more people. The group dynamics module 260 may also work in conjunction with the conversation analysis module 254 to more accurately predict the number of people who will participate in an event. For example, if a first user of the group in the previous example sends a message to say "Sorry, I can't make it," while a second user sends a message indicating that he intends to bring three friends with him, then the conversation analysis module 254 may inform the group dynamics analysis module 260 that the first user will not participate in the event, but three additional people will be participating. As a result, the group dynamics analysis module 260 may subsequently ignore the profile information of the first user when determining the common dining preferences of the group and search for dining establishments with seating for groups of eight people rather than six people.

The weather analysis module 262 receives and analyzes weather data associated with the locations of users in a conversation to help generate links and refine the linked content that is selected. For example, if a group of users is planning an activity and the weather data indicates that a rainstorm is coming, then the weather analysis module 262 may instruct the linked content module 270 to give more weight to indoor activities (e.g., an arcade). The weather analysis module 262 may also provide weather information to the linked content module 270 if the phrasing analysis module 252 or the conversation analysis module 254 detects a message in which a user expresses a desire to see a weather forecast. For example, if a user sends a message to ask another user, "Have you checked the weather yet?" then the weather analysis module 262 may provide a local weather forecast for the linked content module 270 to add to the message.

The image analysis module 264 uses pattern recognition, optical character recognition (OCR), or other image analysis methods to analyze pictures attached to text messages. For example, suppose a user sends a message consisting of the text "What do you think of these?" and a picture of a pair of jeans. Although the text may not contain enough useful information for the phrasing analysis module 252 and the conversation analysis module 256 to interpret, the image analysis module 264 may be able to recognize that the picture contains a pair of jeans and instruct the linked content module 270 to provide the user with linked content related to apparel and shopping (e.g., a coupon to purchase jeans at a discounted price at a nearby shopping center).

The global context analysis module 266 analyzes a wide range of data to find relationships between conversation messages and real-world events. The module 266 may receive and analyze data from a number of different third-party services such as social networking systems, news feeds, weblogs, and other sources to find trending topics that have caught the attention of a large group of people. The module 266 may also perform frequency analysis on text messages received by the analysis and targeting module 214 to detect sudden increases in the popularity of certain terms. For example, if a well-known actor is arrested for committing a serious crime, then there would likely be a sudden increase the number of times the actor's name is mentioned on social networks, news articles, weblogs, and text messages. In addition, the extra publicity for the actor is far more likely to be directed toward the crime than the actor's recent movies. The global content analysis module 266 would determine that the actor was recently involved in some sort of significant event and inform the linked content module 270. As a result, the linked content module 270 may link the actor's name to news articles about the actor instead of to local theaters that are screening the actor's most recent movie.

The global context analysis module 266 may also operate in conjunction with the location analysis module 258 to add linked content related to events or information near the user's current location. For example, the module 266 may be configured to analyze data related to local traffic conditions, delays at nearby airports, train schedules, or nearby events, such as concerts and sporting events. If the module 266 determines that a message is related to any of this local information, it can forward the appropriate data to the linked content module 270 to be displayed to the user.

The link generation module 268 receives text messages from client devices 102 and determines which words and phrases in the text messages will be turned into links. The link generation module 268 may select words and phrases based on analysis performed by any of the analysis modules 252 through 266. Continuing with the previous example, the global content analysis module 266 may instruct the link generation module 268 to turn all instances of the well-known actor's name into a link after detecting that the actor has been involved in a significant event that is receiving a large amount of publicity.

In addition, the link generation module 268 may add a link to be displayed independently of the original text of the message. As described above with reference to the messaging module 118 of FIG. 1, this function is useful if the current text message does not contain any character strings that can easily be associated with linked content relevant to the conversation. The added link may be a visual representation (e.g., an icon) or an additional character string; in the example presented with reference to the group dynamics module 260, the linked content module 268 may add skateboard and basketball icons (or an additional character string that reads "nearby skate parks and basketball courts") to the end of a conversation message and have the added items function as links.

The link generation module 268 may also add links to a text message by executing the targeting rules associated with the client device 102 that was used to send the message. In this case, the link generation module 268 accesses the device-rule association table 214 to determine which targeting rules are associated with the client device 102. After determining the targeting rules to be executed, the module 268 retrieves the targeting rules from the targeting rule database 210 and executes the rules on the message. A detailed description of the contents of a targeting rule and the process of executing a target rule is provided in conjunction with FIG. 3 and FIG. 5.

To avoid overwhelming the user with a large number of links, the link generation module 268 may be configured to stop adding links after meeting certain threshold. For example, the module 268 may be configured to add a maximum of five links to every ten messages in a conversation. The link threshold may alternatively be defined at the message level. For example, the module 268 may be configured to add a maximum of two links to a single text message in a conversation. The link generation module 268 may also limit the number of added links by maintaining a fixed separation between consecutive links in a message or conversation. For example, the module 268 may be configured to separate consecutive links by at least four words. The module 268 may also be configured to maintain an average number of links per word (e.g., one link for every six words).

After the link generation module 268 turns certain words and phrases of a message into links, the linked content module 270 selects the linked content that will be displayed when the user selects the links. In one embodiment, the linked content module 270 chooses the linked content as soon as the link generation module 268 selects the words and phrases that are to be turned into links. Configuring the linked content module 270 to select the linked content immediately after the link generation module 268 chooses the links beneficially increases the speed with which the linked content can be displayed after a user selects the corresponding link. In addition, selecting the linked content before a link is selected enables the messaging module 118 to display indicator icons or other visual representations next to the links, as described with reference to FIG. 1. Alternatively, the linked content module 270 may select the linked content corresponding to a link responsive to receiving a notification from the client device 102 indicating that the user has selected the link. This beneficially prevents the linked content module 270 from searching for linked content corresponding to links that are not selected, thus reducing the computing load on the processor 122 and increasing the performance and responsiveness of the processing server 120.

The linked content module 270 may select linked content based on the results of any of the analysis modules 252 through 266. In addition, the linked content module 270 may combine the results from multiple analysis modules 252 through 266 when selecting linked content. For example, if the group dynamics analysis module 260 determines that all three people in a conversation enjoy Indian food, the conversation analysis module 254 and temporal analysis module 256 determine that the three people wish to eat lunch at noon, and the location analysis module 258 can generate a common region that is accessible to the three people, then the linked content module 270 would retrieve a list of Indian restaurants that are located in the common region and will be open at noon. In addition, the linked content module 270 may select content based on any targeting rules whose conditions have been satisfied.

The selected linked content may be any content that is relevant to the conversation and the linked word. Linked content may include, for example, search engine results, news articles, listings for local restaurants, shopping malls, or movie theaters, reviews of movies, weather conditions or forecasts, images, or maps. The linked content module 270 may also include paid advertisements as part of the selected linked content.

Any of the analysis modules 252 through 266 may also use data from the analysis database 208 to refine the results that the modules 252 through 256 provide to the link generation module 268 and the linked content module 270. For example, if data in the analysis database 208 indicates that people are more likely to go to a fast food establishment for lunch than for dinner, then the temporal analysis module 256 may instruct the linked content module 270 to give more weight to fast food restaurants when providing linked content to users who are making lunch plans.

The subject matter described with reference to the analysis modules 252 through 266 does not provide a comprehensive description of the functionality of the analysis and targeting module 216. In other embodiments, the analysis and targeting module 216 may use other analysis methods either in addition to or in place of the methods described herein to refine the linked content that is provided to users. In addition, the functionality of any of the analysis modules 252 through 266 described herein may be combined or divided into additional or different modules. For example, a single text analysis module may be configured to perform the functions of the phrasing analysis module 252 and the conversation analysis module 254.

In addition to analyzing messages that are exchanged between users, the analysis and targeting module 214 may also be configured to provide results for queries that users submit directly to the processing server 120. In one embodiment, an additional module on the client device 102 may present the user with a user interface that allows the user to input key words and, optionally, input the names of other users. The ability to directly submit queries to the processing server 120 beneficially allows users to access the targeted search functions of the analysis and targeting module 214 without exchanging any text messages. For example, suppose a user wishes to make lunch plans with two co-workers who are working in nearby cubicles. Instead of sending a text message to the two co-workers, the user may submit a query with the keywords "restaurant lunch today" and the names of two other users. After receiving the query, the analysis and targeting module 214 would provide the user with a list of nearby restaurants that are open for lunch and match the overlapping dining preferences of the three users. Once the user chooses a restaurant from the list, the user may simply inform the two co-workers by walking over to their respective cubicles.

A user may also request linked content for a word or phrase in a message that was not turned into a link. For example, suppose a user receives the message "Let's go for a bike ride through Shoreline Park" and the link generation module 268 turned "Shoreline Park" into a link but did not turn "bike" into a link. If the user wishes to view linked content associated with the word "bike" (e.g., to view a list of local bike shops), then the user may select the word "bike" and have the analysis and targeting module 214 generate the results. In one embodiment, the ability to request linked content for a word is implemented by simply performing a query using relevant words in the message as key words.

Alternatively, the linked content module 270 may provide the user with multiple categories of linked content if the analysis and targeting module 214 is unable to determine a single meaning for a link. For example, suppose a user receives the same message as in the previous example, except the phrasing analysis module 252 turns the phrase "bike ride through Shoreline Park" into a single link. In this case, the linked content module 270 may provide the user with a list of local bike shops, weather information for the area, and a map with directions to Shoreline Park. To avoid overwhelming the user with a large amount of information, the client device 102 may be configured to display the information in three separate pages or tabs.

In one embodiment, a user may opt out of providing some or all of the information that is used by the analysis and targeting module 214. For example, a user may configure his or her client device 102 so that the device 102 does not send any geographical location data to the location analysis module 258. As described above with reference to FIG. 2A, a user may also prevent the user profile manager 202 from collecting certain information about the user, such as the user's demographic information or dining preferences. Although providing less user information may cause the analysis and targeting module 216 to generate less relevant results, it beneficially allows users to preserve their privacy and maintain control of their personal information.

Figure 3:
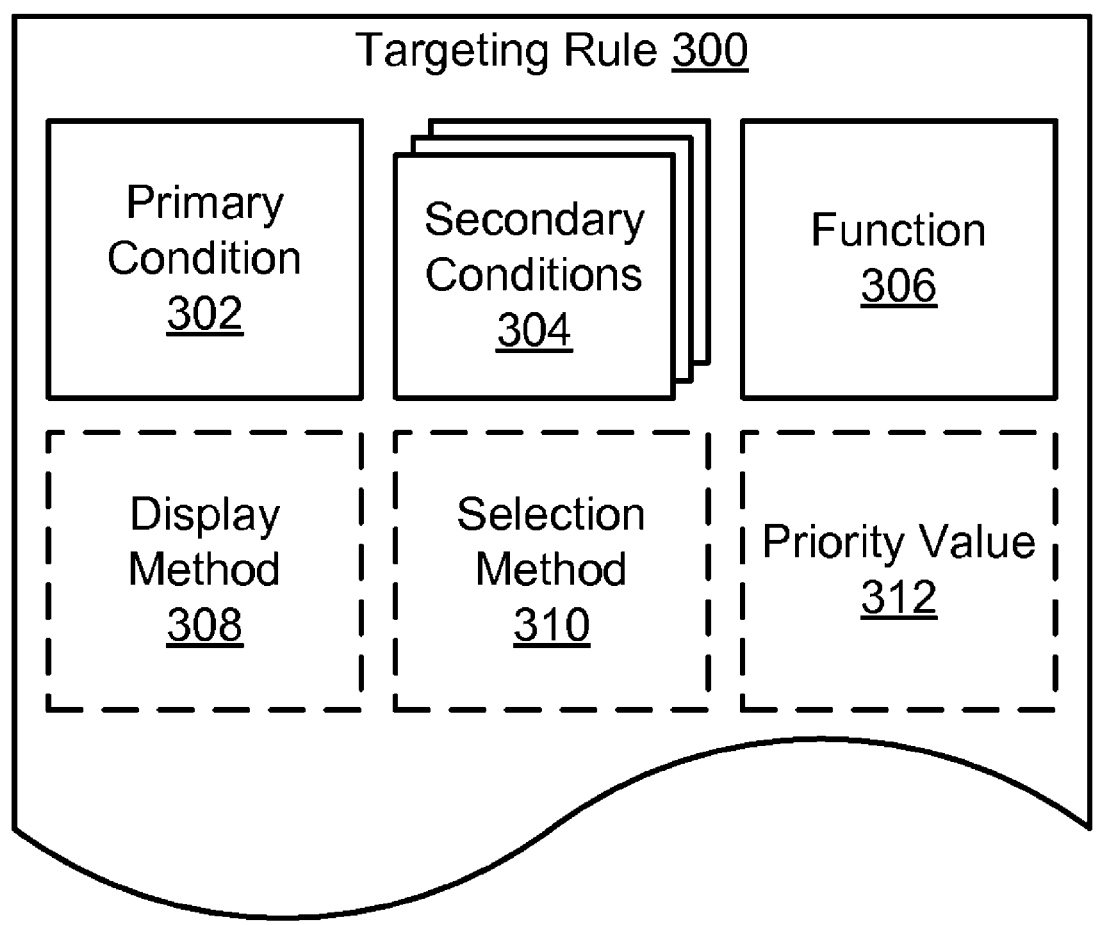
FIG. 3 is a block diagram illustrating an example data structure for implementing a targeting rule, according to one embodiment.

FIG. 3 is a block diagram illustrating an example data structure for implementing a targeting rule 300, according to one embodiment. The targeting rule 300 contains a primary condition 302, one or more secondary conditions 304, and a function 306. In addition, the targeting rule 300 may optionally specify a priority value 308, a display method 310, and a selection method 312. As a whole, the purpose of a targeting rule 300 is to add the predetermined function 306 to any message that satisfies the conditions 302, 304.

When executing a targeting rule 300, the link generation module 268 analyzes the primary condition 302. If the primary condition 302 is satisfied, then the link generation module 268 proceeds to analyze the secondary conditions 304. The primary condition 302 is typically based on a set of character strings (e.g., words or phrases); if at least one character string in the set is present in a text message, then the primary condition 302 is satisfied. For example, if the targeting rule 300 is meant to promote a Ford dealership in San Jose, then the primary condition 302 may instruct the link generation module 268 to determine whether a character string from the set consisting of "Ford," "Mercury," "new car," and "test drive" is present.

The primary condition 302 may also be based on results from any of the analysis modules 252 through 266. In particular, the primary condition may be based on the context of the conversation as determined by the conversation analysis module 254. For example, if the targeting rule 300 is meant to display a coupon for a restaurant, the primary condition 302 may be satisfied when the conversation analysis module 254 determines that the conversation is about dinner. In this case, the primary condition 302 may also specify a set of generic food-related character strings ("food," "meet," "eat," etc) that the link generation module 268 may turn into links when used in a conversation related to dinner plans.

The secondary conditions 304 are additional conditions that are to be satisfied before the function 306 is added to the text message. Secondary conditions 304 may be used to add precise targeting criteria to increase the probability that the function 306 will be displayed to a suitable group of users. To continue with the previous example, the targeting rule 300 for promoting the Ford dealership in San Jose may contain a secondary condition 304 that requires a client device 102 to be located within the city of San Jose. If the dealership is having a sale on pickup trucks, further secondary conditions 304 may be created so that the function 306 is only added to a text message if the user is a 25-to-34-year-old male.

Any of the secondary conditions 304 may also be based on results from the analysis modules 252 through 266. For example, a secondary condition 304 may be satisfied when a client device is inside a region defined by a "geofence," as described with reference to the location analysis module 258. A different secondary condition 304 may configured so that it is satisfied when the group dynamics analysis module 260 determines that every user in a group of at least five users enjoys Indian food. The ability to use results from the analysis modules 252 through 266 beneficially allows for the creation of precise targeting rules 300 that are displayed to users who meet a strict set of conditions.

The function 306 of the targeting rule 300 defines an action that occurs on the client device 102 after a user selects a link that was generated based on the targeting rule 300. The function 306 can define any action that the client device 102 is capable of performing. For example, the function 306 can prompt an action of displaying any sort of information (e.g., a list of places, an advertisement, a map, weather conditions, etc), playing a video or audio file, launching a different application on the client device 102, or sending a text message. If one of the secondary conditions 304 limits the rule 300 to a certain type of client device 102 (e.g., mobile phones), then the function 306 can also specify an action that is specific to the type of client device 102 (e.g., trigger a phone call).

The function 306 is typically presented as part of other results that the linked content module 270 selected for the link. For example, if the function 306 of a targeting rule 300 is to place a call to a local Indian restaurant, then an option to call the restaurant may be displayed together with information for other nearby Indian restaurants that were selected by the linked content module 270. Presenting the function 306 together with other linked content beneficially allows users to see a more diverse range of information. However, a targeting rule 300 may also be configured so that its function 306 is the only option that appears after selecting a link. This is a reasonable option for brand names and trademarked terms. For example, a targeting rule 300 for the fast food chain MCDONALDS may be configured to generate a link for the character string "Mcdonalds" and exclusively display nearby MCDONALDS locations when a user selects the link.

The targeting rule 300 may optionally contain a display method 308 and a selection method 310. If the primary and secondary conditions 302, 304 are satisfied and the targeting rule 300 results in the creation of a link, then the display method 308 and selection method 310 determine how the user interacts with the link.

The display method 308 determines how the messaging module 118 displays the link to the user. The display method 308 may specify that the linked character string be formatted differently (e.g., underlined, displayed in a different font, highlighted, etc.) or specify that an icon be placed next to the link. The display method 308 may also include a non-visual signal either in addition to or in place of a change in formatting. For example, the display method 308 could activate a vibration device in the client device 102 or cause the client device 102 to play a sound effect. The ability to define a display method 308 beneficially allows the creator of the targeting rule 300 to make a link stand out from the rest of the message. For example, an advertiser that wishes to invoke a preexisting brand association may create a targeting rule 300 that causes one of their trademarks to be displayed in the same color and font as their logo (e.g., the string "STARBUCKS" may be displayed in white text and green highlighting to match the colors of the company's logo).

The selection method 310 determines how the user selects the link. For example, the selection method 310 may specify that the user can select the link by clicking, tapping on, or rolling over the link, or by performing a predefined mouse or touchscreen gesture. The selection method 310 may also use other input methods, such as having the user shake the client device 102 in a manner that can be detected by an accelerometer in the device 102, give the client device 102 a voice command via a microphone, or press an dedicated external button on the device 102.

If the targeting rule 300 does not contain a display method 308 or selection method 310, then the messaging module 118 may use a set of predefined default settings to display the link and allow the user to select the link. Since a customized display method 308 and selection method 310 can be used to demonstrate a single entity's ownership of a particular word or phrase, it is common for a targeting rule 300 to omit the display method 308 and selection method 310 if the set of character strings defined in the primary condition 302 contains generic terms that are likely to yield other results in addition to the specified function 306. For example, the targeting rule 300 for the Ford dealership in San Jose might omit the display method 308 and selection method 310 because the linked content module 270 is likely to retrieve and display results for additional car dealerships if the strings "new car" or "test drive" are turned into links and selected by the user.

The targeting rule 300 may also contain a priority value 312 that defines a priority for the rule 300. If multiple targeting rules 300 are associated with a client device 102, then the priority value 312 determines the order in which the link generation module 268 executes the rules 300. As described above with reference to FIG. 2B, the link generation module 268 may impose a limit on the number of links that can be added to a single conversation or message. Thus, an advertiser that is using a targeting rule 300 to deliver an advertisement may pay an additional advertising fee for a higher priority value.

If one of the rules 300 associated with a client device 102 does not have a priority value 312, then the link generation module 268 may automatically give the rule 300 a lower priority than the rules that do have priority levels. Alternatively, the link generation module 268 may automatically give the rule 300 a higher priority (e.g., rules without priority values may be reserved for especially important content) or assign an arbitrary priority value to the rule 100. Meanwhile, if none of the rules 300 associated with a client device 102 have priority values, then the link generation module 268 may simple execute the rules 300 in an arbitrary order.

At a high level, the analysis and targeting module 214 uses two distinct but related methods for adding links and corresponding linked content to text messages. In the first method, the analysis modules 252 through 266, the link generation module 268, and the linked content module 270 operate together to analyze conversation messages and automatically generate links and linked content for the messages. In the second method, the link generation module 268 and the linked content module 270 generate links and linked content by executing predefined targeting rules, and the targeting rules may be based on results from the analysis modules 252 through 266.

The first method (i.e., automatic generation) is beneficially able to provide linked content that is more dynamic, relevant, and up-to-date. In particular, it may be difficult to implement the functionality of analysis modules that are based on actively changing external data (e.g., the global content analysis module 266) as targeting rules 300. Meanwhile, the second method (i.e., executing targeting rules) may be performed with fewer computing resources (i.e., a faster response time) and provides advertisers and other content providers with a straightforward way of targeting their content to users. Given that both methods come with specific benefits and drawbacks, it is typically beneficial to configure the analysis and targeting module 214 to use both methods together.

Examples of Linked Content

Figures 4A, 4B:
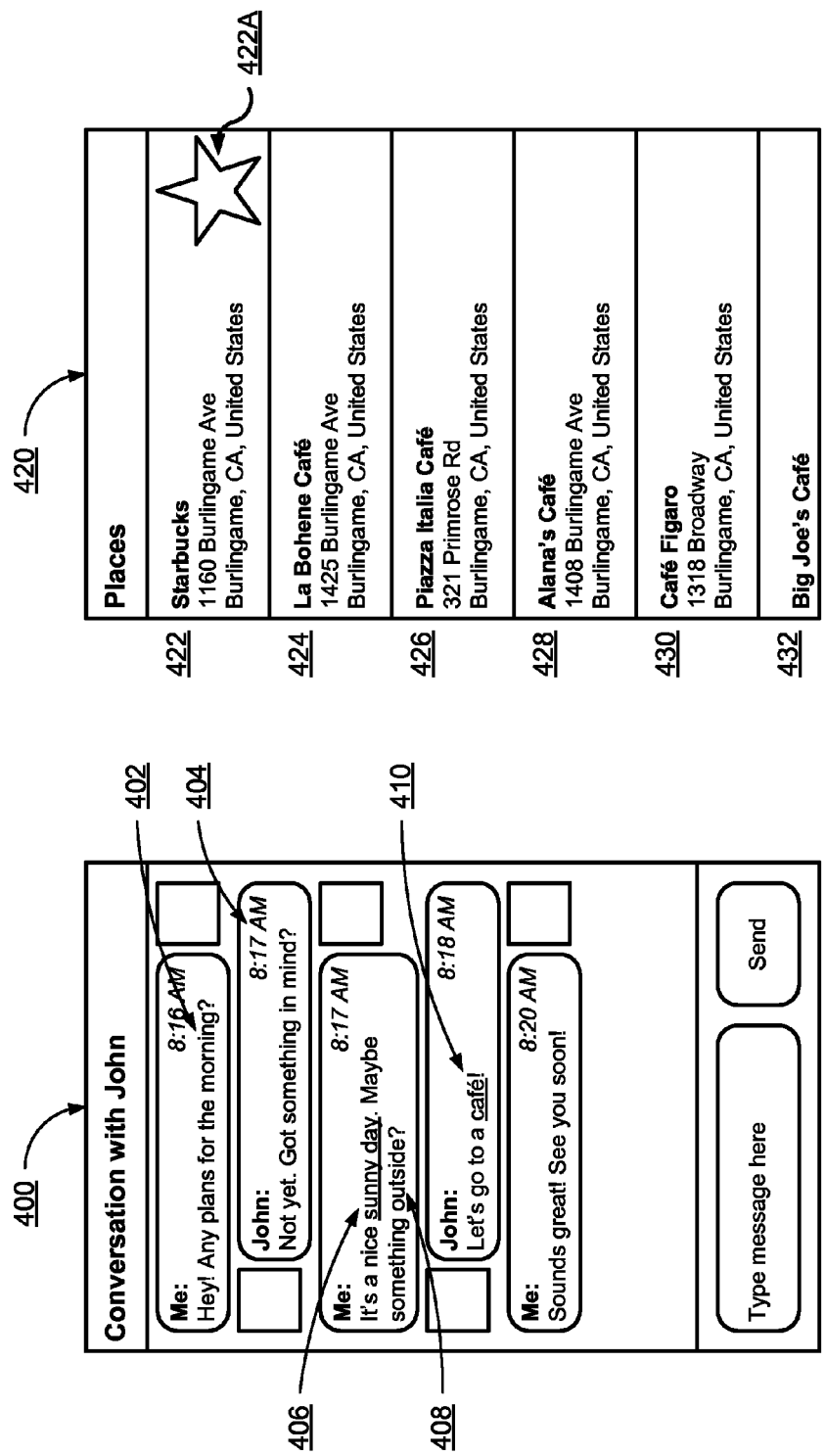
FIGS. 4A and 4B are screenshots that illustrate an example of how linked content may be added to text messages, according to one embodiment.

FIGS. 4A and 4B are screenshots that illustrate some examples of how linked content may be added to text-based personal communications, according to one embodiment. In the screenshot 400 of FIG. 4A, a first user is shown exchanging messages with a second user (John) early in the morning, and the two users make plans to go to a café together later in the morning. After each message is received at one of the two users' client devices 102, the message is sent to the analysis and targeting module 214, which performs multiple types of analysis on each message and on the conversation as a whole.

In the third message, the first user mentions that "it's a nice sunny day." After receiving this message, the phrasing analysis module 252 determines that the term "sunny day" 406 is a single phrase and that the presence of the term in the message indicates that the first user may be interested in viewing current weather conditions. As a result, the module 252 instructs the link generation module 268 to turn the entire term 406 (e.g., "sunny day") into a link, and the weather analysis module 262 retrieves the current weather conditions for the first user's location so that it can be displayed if the user selects the "sunny day" link 406.

As the two users exchange messages, the conversation analysis module 254 detects that the two users are planning a social activity and works with the temporal analysis module 256 to predict a timeframe for the proposed activity. Based on the timestamps 404 of the messages and the word "morning" 402 in the first message, the modules 254, 256 may predict that the two users plan to make their trip sometime between 8:20 AM and noon. As a result, the modules 254, 256 instruct the linked content module 270 to filter out results for establishments that will be not open during those hours. The conversation analysis module 254 also detects the word "outside" 408 in the third message. Although the word 408 is not significant enough to be turned into a link, the conversation analysis module 254 determines that the two users would prefer to engage in an activity outdoors.

After the fourth message, the analysis and targeting module 214 has received enough information to determine that the two users wish to visit a café with outdoor seating later in the morning. As a result, the link generation module 268 turns the word "café" 410 in the fourth message into a second link. Meanwhile, the location analysis module 258 receives geographical location data from the two users' client devices 102 and generates a common region that is accessible to both users. The linked content module 270 subsequently generates a list of cafés that satisfy the conditions determined by the analysis and targeting module 214 and are located inside the common region.

FIG. 4B is a screenshot 420 of the list of cafés that is displayed to the user after the user selects the "café" link 410 in the previous screenshot 400. In addition to the results 424 through 432 that were retrieved by the linked content module 270 based on the results of the analysis modules 252 through 266, there may also be additional results from advertisers. In the example shown, STARBUCKS pays to have their closest location placed at the top of the list 422, and a star 422A indicates that the first result was added as a paid advertisement.

The addition of the advertisement may be the result of a targeting rule 300 that was executed by the link generation module 268 and the linked content module 270. Alternatively, the linked content module 270 may have found the STARBUCKS location while searching for the other cafés, and STARBUCKS may have simply paid an extra fee to have their locations shifted to the top whenever they show up in a list. The ability to add targeted content to text messages is extremely valuable to advertisers because the users who view the advertisements are much more likely to partake in whatever is being advertised.

Adding Linked Content to Text Messages

Figure 5:
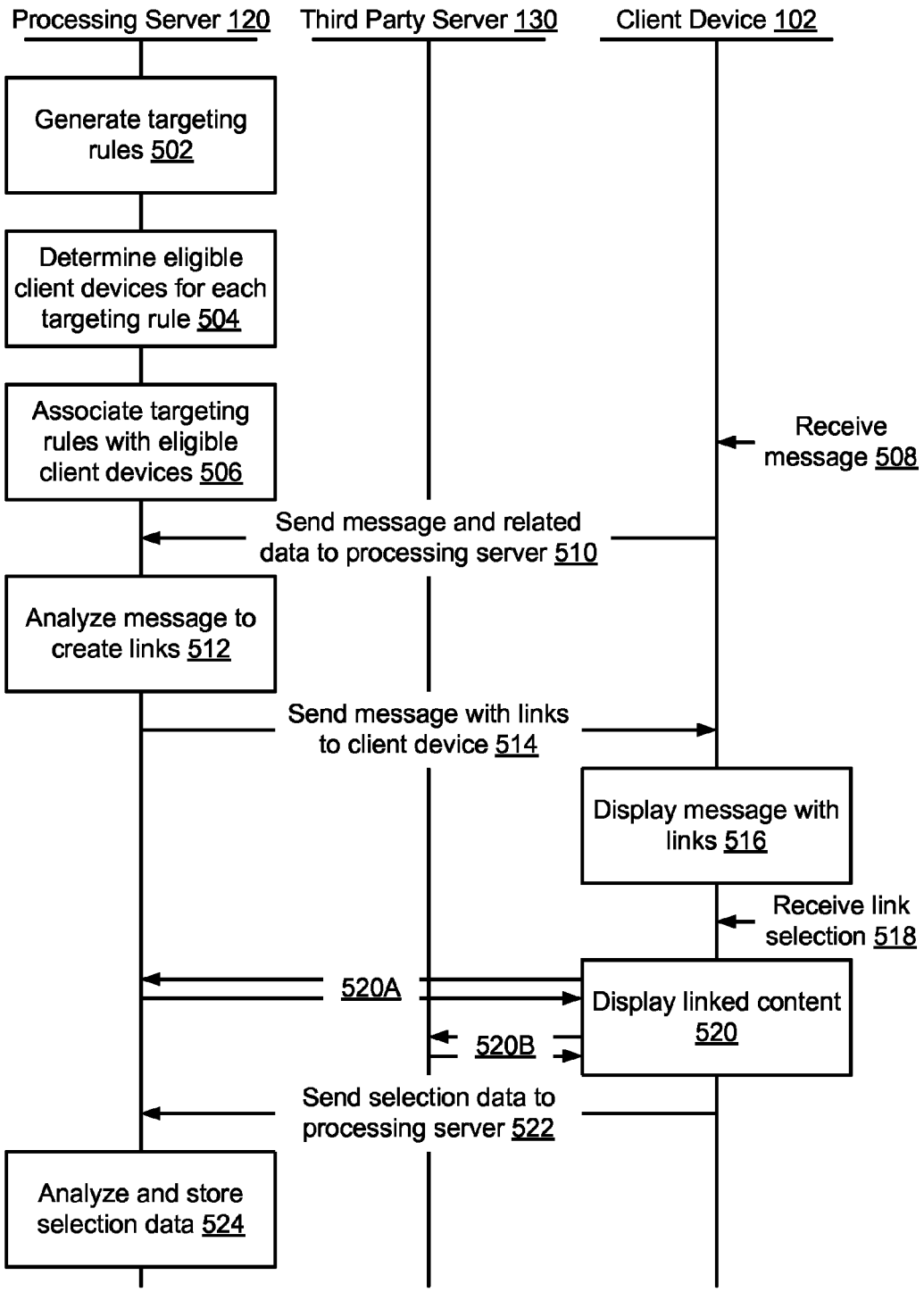
FIG. 5 is an interaction diagram illustrating a process for using the processing server of FIG. 1 to add linked content to a text message, according to one embodiment.

FIG. 5 is an interaction diagram illustrating a process for using the processing server 120 of FIG. 1 to add linked content to a text message, according to one embodiment. The processing server 120 generates 502 one or more targeting rules. As described with reference to FIG. 2A and FIG. 3, targeting rules can used to add linked content to text messages that meet a set of predefined conditions. As described above with reference to FIG. 3, targeting rules are particularly useful to advertisers because the targeting rules give advertisers a way of displaying advertisements to extremely specific and narrowly-defined groups of users who are especially likely to be interested in the content of the advertisement. Thus, an advertiser may work with an administrator of the processing server 120 to generate 502 a targeting rule to distribute an advertisement. Alternatively, the processing server 120 may provide advertisers with a computer tool that the advertisers can use to generate targeting rules and transfer the rules to the processing server. In addition, the processing server 120 may also generate 502 targeting rules that are used to distribute non-advertising content.

After the processing server 120 generates 502 or receives one or more targeting rules, the rules are stored in the targeting rule database 210 and the pre-screening module 212 pre-screens each rule to determine 504 a list of eligible client devices 102 that are likely to satisfy the conditions defined in the rule. As described with reference to FIG. 2A, the pre-screening module 212 operates by determining whether a client device 102 and its corresponding user profile matches matching one or more pre-screening criteria (which are selected from the conditions 302, 304 of the rule). The pre-screening module 212 then proceeds to associate 506 the targeting rule with the eligible client devices 102 and stores the associations in the device-rule association table 214.

Meanwhile, the client device 102 receives 508 a text message and sends 510 the message to the processing server for analysis. The client device 102 may also send 510 related data (e.g., the current location data of the device 102) along with the message. After receiving the message, the analysis and targeting module 214 analyzes 512 the message using a wide range of techniques to add one or more links to the message. As described with reference to FIG. 2B and FIG. 3, the analysis and targeting module 214 may automatically add a link based on results from one or more of the analysis modules 252 through 266, or the module 214 may add a link after executing a targeting rule 300 and determining that the conditions of the rule 302, 304 have been satisfied.

The message may also originate from a non-text-based message. For example, a third-party voice mailbox system may receive an audio message for the user and use voice recognition algorithms to generate a text message corresponding to the audio message. The resulting text message may be sent 510 directly to the processing server 120, or it may first be sent to the client device 102 and relayed to the processing server 120. Alternatively, the processing server 120 may also include one or more modules for processing audio messages, text messages, or other types of messages, and these messages may be received directly at the processing server 120 to eliminate the need to send 510 the message from the client device 102 to the server 120. In either case, the processing server 120 analyzes 512 and adds links to the text message in the manner described above.

After the links are links added to the message, the processing server 120 sends 514 the message back to the client device 102, and the messaging module 118 displays 516 the message with the links. The linked content module 270 may optionally select the linked content corresponding to each link and send 514 the linked content along with the message. If the client device 102 receives 518 a link selection from the user, then the messaging module 118 displays 520 the linked content corresponding to the selected link. As described above with reference to the messaging module 118 of FIG. 1, the linked content may have been sent along with the message. The client device 120 may also retrieve 520A the linked content from the processing server 102 after the user selects the link.

Alternatively, the linked content module 270 may use results from the analysis modules 252 through 266 to generate a series of instructions that the client device 102 can use to retrieve the linked content from a third party and associate the instructions with the corresponding link. For the example conversation shown in the screenshot 400 of FIG. 4A, the linked content module 270 may generate instructions for the client device 102 to use a local search service (e.g., YELP) to find a café that is located near the two users, has outdoor seating, and is open between 8:20 AM and noon on the day the messages were sent, and associate the instructions with the link for the word "café" 410 in the fourth message. In this case, the instructions are sent 514 along with the message, and the client device 102 retrieves 520B the linked content from a third-party server 130 after receiving 518 a user's selection of the link 410.

The client device 102 also sends 522 data about the user's selections back to the processing server 102, and the data analysis module 206 analyzes 524 the data and stores the data in the analysis database 208. The data in the analysis database 208 can subsequently used to refine the linked content that is provided to other users. For example, if users repeatedly select the fourth choice (Alana's Café) 428 in the example linked content 420 shown in FIG. 4B, then Alana's Café may be shown as the second choice to future users who are looking for a café in the same area. Although the process of sending 522 the selection data is shown as occurring after the client device 102 displays 520 the linked content, the client device 102 may also send selection data in response to receiving 518 a link selection.

The data generated by the analysis 524 can also be used to enhance the advertising capabilities of the system 100. For example, an advertiser may specify that an advertisement be displayed to a predefined number of unique users, be displayed with a particular frequency (e.g., 100 times per day), or define a length of time that should elapse between consecutive displays of the advertisement. It is also possible to monitor users' reactions to the advertisement. The analysis of the selection data 524 may determine how frequently users select the advertisement, how long users spend viewing the advertisement, or how many users interact with the advertisement in a certain way (e.g., select a link within the advertisement to visit a web page, make a defined transaction, etc). Since the data analysis module 206 can reliably keep track of any of these parameters, these parameters may be used as a basis for calculating advertising fees.

Alternative Embodiment: Client-Side Message Analysis

Figure 6A:
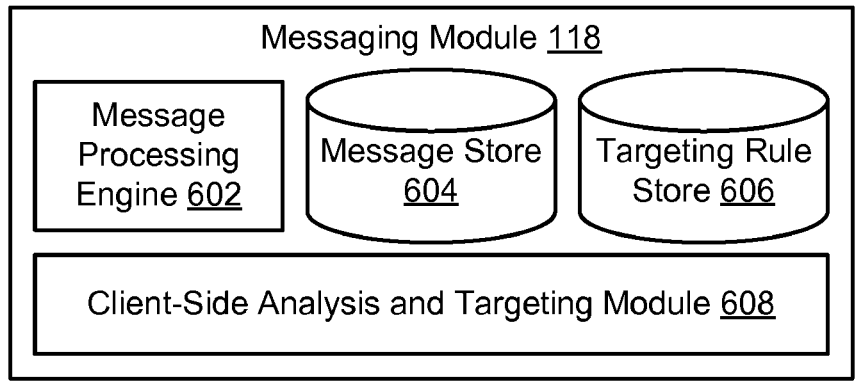
FIG. 6A is a block diagram illustrating the messaging module of FIG. 1, according to an alternative embodiment.

FIG. 6A is a block diagram illustrating the messaging module 116 of FIG. 1, in accordance with an alternative embodiment. In this embodiment, the client device 102 does not send messages to the processing server 120 for analysis. Instead, the messaging module 116 on the client device 102 contains additional components for analyzing messages and adding relevant linked content to the messages.

The message processing engine 602 performs the functions associated with exchanging and displaying text messages. As described with reference to FIG. 1, this includes sending and receiving text messages over a variety of protocols and displaying the messages in conjunction with the corresponding links and linked content. The message store 604 stores text messages that the message processing engine 602 previously sent or received. Storing messages locally allows the client-side analysis and targeting module 608 to perform conversation analysis and temporal analysis. The targeting rule store 606 stores targeting rules that the pre-screening module 212 associates with the client device 102. It is beneficial to maintain a local copy of the targeting rules because the message analysis is performed locally.

The client-side analysis and targeting module 608 performs message functions that are analogous to the analysis and targeting module 216 of the embodiment described with reference to FIG. 2. However, some components of the client-side analysis and targeting module 608 operate differently because the client device 102 does not have access to as much information as the processing server 120. A description of these differences and of the general operation of the client-side analysis and targeting module 608 is presented below with reference to FIG. 6B.

Figure 6B:
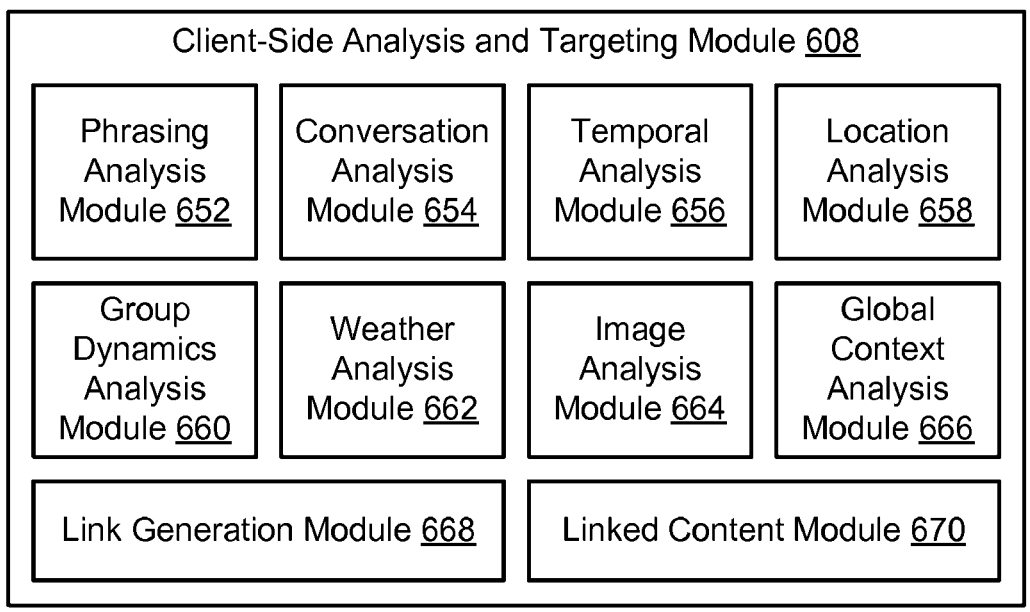
FIG. 6B is a block diagram illustrating a detailed view of the client-side analysis and targeting module, according to the embodiment of FIG. 6A.

FIG. 6B is a block diagram illustrating a detailed view of the client-side analysis and targeting module 608, according to the alternative embodiment of FIG. 6A. Since client devices 102 normally interact with the processing server 120 via a remote connection over the network 132, the client-side analysis and targeting module 608 might have limited access to the data that is maintained in the linked content management module 128 (e.g., the data in the user profile store 204 and the analysis database 208). In some circumstances, the client-side analysis and targeting module 608 might be completely unable to access this data (e.g., if the client device 102 is unable to communicate with the processing server 120 or if the processing server malfunctions 120). In addition, the client-side analysis and targeting module 608 may not be able to directly access information on other client devices 102, either due to privacy restrictions on the other client devices 102 or due to unreliable connections over the network 132. Thus, some of the analysis modules 652 through 666 in the client-side analysis and targeting module 608 may be reconfigured to be make more effective use of data that is stored locally on the client device 102 and less dependent on data that is stored remotely.

Since the phrasing analysis module 652, conversation analysis module 654, and temporal analysis module 656 perform analysis that is primarily based on the content of the text messages, these modules 652, 654, 656 may simply retrieve any relevant messages from the message store 604 and perform substantially the same analysis as the analogous modules 252, 254, 256 described with reference to the embodiment of FIG. 2B.

The location analysis module 658 receives geographical location data from the location module 114 and can perform a point-of-interest analysis or determine whether the client device 102 is inside a "geofence." However, the location analysis module 658 may not be able to retrieve location data for other users in a conversation (e.g., the other users might configure their client devices 102 so that the location module 114 does not send location data to other client devices). If location data is not available for other users, then location analysis module 658 is not able to generate a common region that can be used to select location based results that are convenient to multiple users in a conversation.

The group dynamics analysis module 660 relies on being able to access and analyze user profiles of multiple people in a conversation. If the module 660 is not able to access the user profile store 204 in the processing server 120 (or if the present embodiment of the processing server 120 does not include a user profile store 204), then the module 660 retrieves information from the user profile modules 116 of other client devices 102 that are part of the conversation. However, users may also have the option of restricting or denying access to the user profile module 116 on their client devices 102. If the group dynamics analysis module 660 is unable to gain access to both the user profile store 204 and the user profile modules 116 of other client devices 102, then the module 660 may simply analyze the user profile module 116 of the client device 102 on which it resides and perform its analysis based solely on a single user's preferences.

Similar to the phrasing analysis module 652, the conversation analysis module 654, and the temporal analysis module 656, the weather analysis module 662 and the image analysis module 664 perform substantially the same analysis as the analogous modules 262, 264 described with reference to FIG. 2B. However, if location data for other client devices 102 in the conversation is not accessible, the weather analysis module 662 may be limited to retrieving and analyzing weather data corresponding to the location of the client device 102 on which it resides. Meanwhile, the image analysis module 664 may be constrained by the weaker computing capabilities of the client device 102 and may not be able to perform an equally thorough analysis as the image analysis module 264 of the embodiment of FIG. 2B.

Although it would be possible to implement the global context analysis module 666 on a client device 102, it would be impractical on most client devices 102 because the device would have to receive a large amount of data from third party servers 130 and perform processor- and memory-intensive data analysis. Thus, it may be preferable to simply omit the global context analysis module 666 in most embodiments.

In contrast to the corresponding modules 268, 270 in FIG. 2B, the link generation module 668 and linked content module 670 may be configured to rely more heavily on executing targeting rules rather than automatically generating links based on the results of the analysis modules 652 through 666. This may be done, for example, by configuring the link generation module 668 to execute the rules in the targeting rule store 606 before using the results of the analysis modules 652 through 666 to automatically generate any links. If the execution of the targeting rules generates enough links to exceed the link threshold for the message or for the conversation, then the process of automatically generating links may be skipped.

As described above with reference to FIG. 2B and FIG. 3, the link generation module 668 executes a targeting rule 300 by determining whether the conditions 302, 304 defined in the targeting rule 300 are satisfied, and any of the conditions may be based on a result from one of the analysis modules 652 through 666. If the conditions 302, 304 are satisfied, then the link generation module 668 turns the appropriate word or phrase in the message into a link, and the linked content module 270 associates the function 306 of the targeting rule 300 with the link.

If multiple targeting rules are to be executed at once, the link generation module 268 starts by analyzing the secondary conditions 304 of each targeting rule to determine what information will be used in the conditions. Next, the link generation module 268 collects the information from the various analysis modules 652 through 666 or from other components of the client device 102 or the system 100 and temporarily stores the information in the memory 106 of the client device 102. For example, suppose the targeting rule store 606 contains a first targeting rule specifying that the user must be inside the city of San Jose and be male, and a second targeting rule specifying that the user must be in San Jose and that a message must be sent between 7 AM and 10 AM. When the user sends or receives a message, the link generation module 268 would use the location analysis module 658 to determine whether the user is in San Jose, use the temporal analysis module to determine the time of day that the user's message was sent, and access the user profile module 116 to determine whether the user is male. After the information is collected and stored in the memory 106, the link generation module 668 can rapidly check the primary and secondary conditions 302, 304 with reduced lag. In addition, the link generation module 268 does not retrieve information that is not used in any of the conditions (e.g., the user's age, current weather conditions, or group dynamics).

This process of collecting relevant information before executing multiple rules at once prevents the link generation module 668 from retrieving unneeded information or retrieving the same information twice (e.g., the user's location information was only collected once even though it is used in both rules), which beneficially allows the rules to be executed faster and with fewer computing resources. While this process of evaluating multiple rules at once may also be performed on the processing server 120 in the embodiment described with reference to FIG. 2B, it is especially beneficial when performed on a client device 102 because many types of client devices 102 (e.g., smartphones, tablet computers, or other portable electronics) have limited power, memory 106, and processing resources 104.

Figure 7:
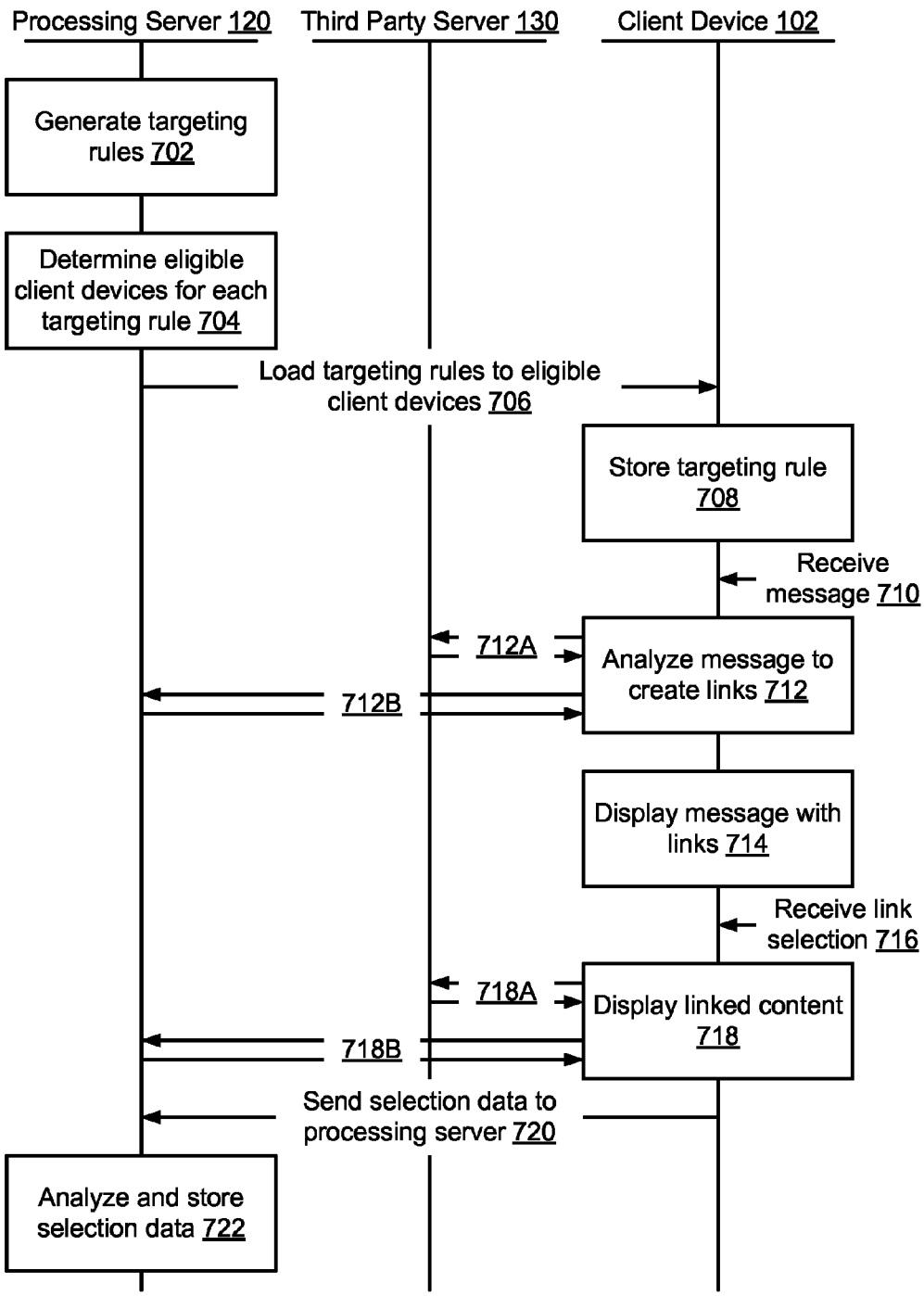
FIG. 7 is an interaction diagram illustrating a process for using a client device to add linked content to a text message, according to the embodiment of FIG. 6A.

FIG. 7 is an interaction diagram illustrating a process for using the client device 102 to add linked content to a text-based personal communication, according to the alternative embodiment of FIG. 6A. Similar to the diagram in FIG. 5, the process begins when the processing server 120 generates 702 targeting rules and pre-screens the rules based on pre-screening criteria to determine 704 a list of eligible client devices 102 that are likely to satisfy the conditions defined in the rule.

Since the client-side analysis and targeting module 608 may be configured to rely more heavily on targeting rules, the processing server may generate 702 additional targeting rules to add links that would normally be generated automatically. For example, one targeting rule could specify that any word from the set consisting of "today," "cloudy," "sunny," "rain," and "weather" be turned into a link for displaying current weather conditions. While the conversation analysis module 654 and the weather analysis module 662 would normally work in conjunction to automatically identify these words and link one of them to current weather conditions, executing the targeting rule would yield roughly the same result. In addition, executing the targeting rule may use fewer computing resources than analyzing the context of the conversation to determine whether a user has expressed a desire to see weather information.

After determining 704 the eligible client devices 102 for each targeting rule, the processing server 120 loads 706 each targeting rule onto the corresponding client devices 102. As a result, each client device 102 receives a set of pre-screened targeting rules with conditions that the client device and the corresponding user profile are likely to satisfy. Upon receiving the rules, the messaging module 118 stores 708 the rules in the targeting rule store 606.

At some point after storing 708 the targeting rules, the client device receives 710 a message and the client-side analysis and targeting module 608 analyses 712 the message to turn some of the words and phrases in the message into links. As described with reference to FIG. 6B, the client-side analysis and targeting module 608 may be configured to analyze 712 the message by executing the targeting rules before attempting to automatically generate any links. Alternatively, the module 608 may rely exclusively on the targeting rules to analyze 712 the message and skip the process of automatically generating links altogether. In either case, the module 608 may access 712A a third party server 130 (e.g., to retrieve weather conditions or associate the geographical location data with a point of interest) or retrieve 712B data from the processing server 120 (e.g., user profile data) when analyzing the message.

After analyzing 712 the message, the message processing engine 602 displays the message to the user and the client device 102 may receive 716 an input from the user indicating that the user wishes to select one of the links. In response to receiving 716 the link selection, the message processing engine 602 displays 718 the linked content corresponding to the user. If the link was generated by a targeting rule, then the client device may simply perform the function 306 that was defined in the targeting rule. If the link was generated automatically, then any of the display methods described with reference to the embodiment of FIG. 5 may be used. In both cases, the client device may once again retrieve 718A information from a third-party server or access 718B the processing server to display the linked content.

Similar to the embodiment described with reference to FIG. 5, the client device 120 also sends 720 selection data back to the processing server 120 for analysis 722 and storage. The data may subsequently be used to define more effective targeting rules, calculate fees for advertisements, or for other purposes.

In general, performing the message analysis functions of the system 100 on the client device 102 may result in less dynamic and relevant linked content. However, performing message analysis on the client device 102 beneficially reduces the time associated with analyzing the message because there is no need to send the message to the processing server 120 and wait for the message to be sent back to the client device 102. In addition, although the embodiment described with reference to FIGS. 2A through 5 contains features to preserve users' privacy, users may find that a system that does not send data to a remote server for analysis allows for even greater privacy of their personal information.

In still another embodiment, the analysis functions of the system 100 are divided between the client device 102 and the processing server 120. In this embodiment, the analysis and targeting module 214 on the linked content management module 128 may be configured to perform analysis that relies more heavily on resources that are available on the processing server 120. For example, the group dynamics analysis module 260, and the global context module 266 may be implemented on the processing server. Meanwhile, the client-side analysis and targeting module 608 may perform analysis that relies on information that is readily available on the client device 102 (e.g., the user's location) or analysis that involves any personal information that a user does not wish to send to a remote server.

Additional Configuration Considerations

The disclosed embodiments beneficially allow for the addition of highly precise and targeted linked content to text messages. In contrast to targeted internet advertisements that are shown on computers, the widespread popularity of text messages allows linked content to be delivered to users while the users are in a wide range of real world situations, and the range of analysis methods that are used to characterize each text message allows for the selection of linked content that is relevant to users. This greatly enhances the interactivity of text messages and provides users with information that they are likely to find valuable.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for adding linked content to text-based communications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing information associated with a text message, comprising:
    receiving a text message, the text message for transmittal from a remote device to a client device via a network using a push technology to establish or continue a conversation between a plurality of users;
    identifying one or more character strings within the text message, each of the identified character strings including a sequence of characters associated with information likely to be inquired by at least one of the plurality of users within a context of the conversation;
    generating, for each of the identified character strings, the information likely to be inquired by the at least one of the plurality of users;
    processing the identified character strings for displaying at the client device, the identified character strings displayed at the client device with the same sequence of characters in a manner distinguishable from other text in the text message; and
    processing a content item for execution at the client device, the content item corresponding to one of the identified character strings, and the content item representing at least part of the information likely to be inquired by the at least one of the plurality of users.

2. The method of claim 1, wherein the text message is received from the client device.

3. The method of claim 1, further comprising receiving at least one additional text message in the conversation between the plurality of users.

4. The method of claim 3, wherein generating the information likely to be inquired by the at least one of the plurality of users comprises analyzing the text message together with the at least one additional text message.

5. The method of claim 1, wherein generating the information likely to be inquired by the at least one of the plurality of users comprises analyzing user profiles associated with one or more of the plurality of users.

6. The method of claim 1, wherein processing the identified character strings comprises sending the identified character strings to the client device for displaying at the client device.

7. The method of claim 1, wherein processing a content item comprises sending the content item to the client device for execution at the client device.

8. The method of claim 1, further comprising generating at least one targeting rule, each targeting rule containing:
    a primary condition for identifying the one or more character strings in the text message based on matching to a set of predefined character strings;

at least one secondary condition, each secondary condition for identifying a characteristic related to the text message; and a function to be executed at the client device.

9. The method of claim 8, wherein identifying the one or more character strings within the text message comprises:

determining whether one of the predefined character strings appears in the text message;

responsive to determining that one of the predefined character strings appears in the text message, determining whether the characteristics identified by the least one secondary condition are present; and responsive to determining that characteristics are present, identifying the predefined character string that appears in the text message.

10. The method of claim 8, wherein the content item for execution at the client device is the function contained in the targeting rule.

11. A system for providing information associated with a text message, comprising:

an analysis and targeting module coupled to a networking module, the analysis and targeting module configured to:

receive a text message from the networking module, the text message for transmittal from a remote device to a client device via a network using a push technology to establish or continue a conversation between a plurality of users;

identify one or more character strings within the text message, each of the identified character strings including a sequence of characters and associated with information likely to be inquired by at least one of the plurality of users within a context of the conversation; and generate, for each of the identified character strings, the information likely to be inquired by the at least one of the plurality of users; and the networking module, configured to:

receive the text message via the network;

send the identified character strings via the network to the client device for displaying at the client device, the identified character strings displayed at the client device with the same sequence of characters in a manner distinguishable from other text in the text message; and send a content item via the network to the client device for execution at the client device, the content item corresponding to one of the identified character strings, and the content item representing at least part of the information likely to be inquired by the at least one of the plurality of users.

12. The system of claim 11, wherein the networking module is further configured to receive at least one additional text message in the conversation between the plurality of users.

13. The system of claim 12, wherein the analysis and targeting module generates the information likely to inquired by the at least one of the plurality of users by analyzing the text message together with the at least one additional text message.

14. The system of claim 11, further comprising a user profile store configured to store a plurality of user profiles, each user profile associated with one of the plurality of users, wherein the analysis and targeting module generates the information likely to inquired by the at least one of the plurality of users by analyzing the user profiles associated with one or more of the plurality of users.

15. The system of claim 11, further comprising a targeting rule store containing a plurality of targeting rules, each targeting rule containing:

a primary condition for identifying the one or more character strings in the text message based on matching to a set of predefined character strings;

at least one secondary condition, each secondary condition for identifying a characteristic related to the text message; and a function to be executed at the client device.

16. The system of claim 15, wherein the analysis and targeting module is configured to identify the one or more character strings within the text message by:

determining whether one of the predefined character strings appears in the text message;

responsive to determining that one of the predefined character strings appears in the text message, determining whether the characteristics identified by the least one secondary condition are present; and responsive to determining that characteristics are present, identifying the predefined character string that appears in the text message.

17. The system of claim 15, wherein the content item for execution at the client device is the function contained in the targeting rule.

18. A non-transitory computer readable medium configured to store instructions, the instructions when executed by a processor cause the processor to:

receive a text message, the text message for transmittal from a remote device to a client device via a network using a push technology to establish or continue a conversation between a plurality of users;

identify one or more character strings within the text message, each of the identified character strings including a sequence of characters and associated with information likely to be inquired by at least one of the plurality of users within a context of the conversation;

generate, for each of the identified character strings, the information likely to be inquired by the at least one of the plurality of users;

process the identified character strings for displaying at the client device, the identified character strings displayed with the same sequence of characters in a manner distinguishable from other text in the text message; and process a content item for execution at the client device, the content item corresponding to one of the identified character strings, and the content item representing at least part of the information likely to be inquired by the at least one of the plurality of users.

19. The computer readable medium of claim 18, further comprising instructions that cause the processor to receive at least one additional text message in the conversation between the plurality of users.

20. The computer readable medium of claim 19, wherein generating the information likely to be inquired by the at least one of the plurality of users comprises analyzing the text message together with the at least one additional text message to determine the information likely to be inquired by the at least one of the plurality of users.

21. The computer readable medium of claim 18, wherein generating the information likely to be inquired by the at least one of the plurality of users comprises analyzing user profiles associated with one or more of the plurality of users to determine the information likely to be inquired by the at least one of the plurality of users.

22. A method for displaying information associated with a text message, comprising:
- receiving a text message at a client device, the text message transmitted from a remote device to the client device via a network using a push technology to establish or continue a conversation between a plurality of users;
- identifying one or more character strings within the text message, each of the identified character strings including a sequence of characters and associated with information likely to be inquired by at least one of the plurality of users within a context of the conversation;
- generating, for each of the identified character strings, the information likely to be inquired by the at least one of the plurality of users;
- displaying identified character strings, the identified character strings displayed at the client device with the same sequence of characters in a manner distinguishable from other text in the text message; and
- executing a content item, the content item corresponding to one of the identified character strings, and the content item representing at least part of the information likely to be inquired by the at least one of the plurality of users.

* * * * *